May 24, 1938.  K. E. McCONNAUGHAY  2,118,616
EMULSIFIER
Filed Sept. 2, 1936
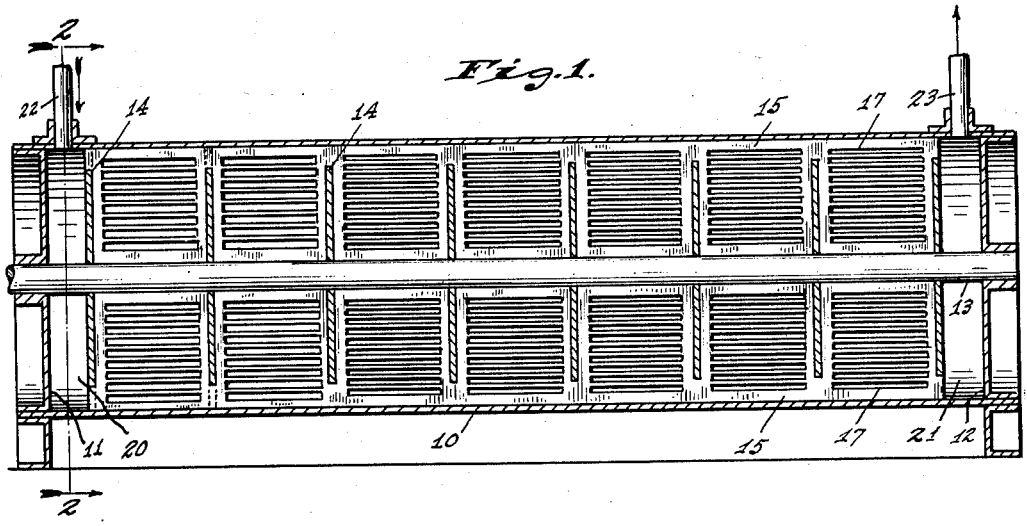
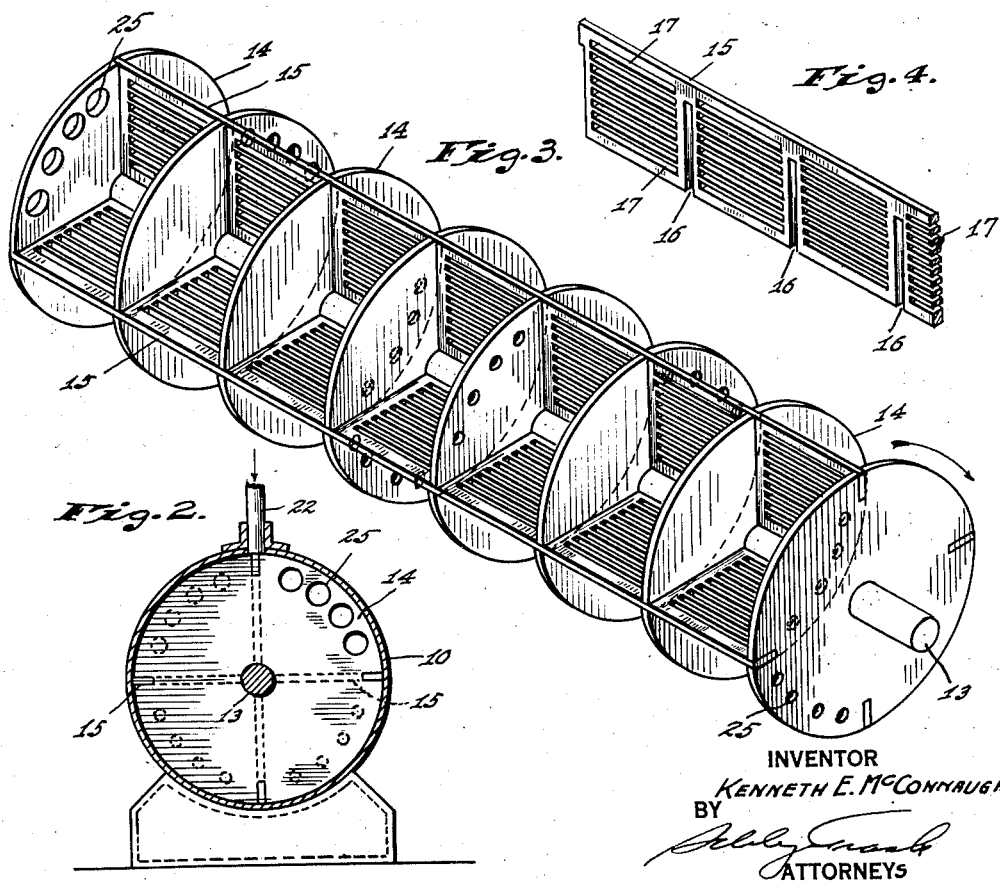
INVENTOR
KENNETH E. McCONNAUGHAY,
BY
ATTORNEYS Patented May 24, 1938

2,118,616

UNITED STATES PATENT OFFICE 2,118,616

EMULSIFIER

Kenneth E. McConnaughay, Otterbein, Ind.

Application September 2, 1936, Serial No. 99,054

7 Claims. (Cl. 259—9)

It is the object of my invention to produce an emulsifying apparatus especially suitable for use in preparing bituminous emulsions of the type in which asphalt or other bitumen is dispersed in water. A further object of my invention is to produce an emulsifier which can be simply and economically constructed and which will be free from any tendency to over-agitate the emulsion.

In carrying out my invention I employ a shell, conveniently a length of pipe, in which there is centrally mounted a longitudinal shaft carrying a series of axially spaced disks and a plurality of angularly spaced plates disposed in generally radial planes. In diameter, the disks approximate the internal diameter of the shell; and in order to permit fluid flow from one end of the shell to the other each disk is provided with one or more openings. The plates, in the spaces between the disks, are also provided with openings, preferably in the form of elongated slots; and the holes in the disks are so arranged that the liquid must flow through at least one of the slotted plates before passing out of the space between any two disks.

The accompanying drawing illustrates my invention: Fig. 1 is a vertical axial section through the emulsifier; Fig. 2 is a vertical transverse section on the line 2—2 of Fig. 1; Fig. 3 is an isometric view of the rotor removed from the shell; and Fig. 4 is a fragmental isometric view showing one of the plates embodied in the rotor.

The cylindrical shell 10 forming the body of the emulsifier is conveniently a length of pipe closed at its ends by heads 11 and 12. Concentric with the shell and supported from the end heads 11 and 12 is a rotatable shaft 13 which extends outwardly beyond one of the heads for connection to any suitable source of power. I provide on the shaft 13 and within the shell a series of axially spaced disks 14 having a diameter closely approximating the internal diameter of the shell. These disks are secured to the shaft 13 in any convenient manner, preferably by welding.

Also supported from the shaft 13 are a plurality of plates 15, here shown as four in number; which extend longitudinally of the rotor and are preferably spaced at equal angular intervals. Conveniently, the plates are mounted by providing them with transverse notches 16 the spacing of which corresponds to the spacing of the disks 14; and the disks are notched at equal angular intervals to receive the portions of the plates lying between the bottoms of the notches 16 and the outer edges of the plates. Between the notches 16 each plate is provided with a series of longitudinally extending slots 17, as is clear from the drawing.

Conveniently, the distance between the two end plates 14 is made somewhat less than the distance between the heads 11 and 12 of the shell 10 in order to provide at the ends of the shell chambers 20 and 21. Into one of these chambers, here shown as the chamber 20, the ingredients of the emulsion are fed. In the case of the device shown in the drawing, it is contemplated that there will be a preliminary mixing of the ingredients and that they will be conducted to the emulsifier through a single supply pipe 22, but it will be understood that it will not be necessary to conduct all the ingredients through a single supply pipe. The chamber 20 at the opposite end of the shell communicates with a discharge pipe 23 through which the finished emulsion is conducted to its point of use or to a suitable container for storage purposes.

Because the disks 14 have a diameter substantially equal to the internal diameter of the shell, provision must be made for permitting the liquid to flow through them. To this end, each of the disks is provided with one or more openings 25. Conveniently, the openings in each disk are arranged in a group between adjacent plates 15, and the groups of holes in adjacent disks are circumferentially staggered so that the liquid is compelled to flow through the slots 17 of one plate 15 before emerging from the space between any two adjacent disks. In the drawing, where the direction of rotation is indicated by the arrow in Fig. 3, the openings in adjacent disks are in adjacent quadrants, the positions of the respective groups of holes in the disks successively progressing in the direction of rotor rotation from the inlet end of the rotor to the discharge end thereof. Because the rotor will be rotating at a rate more rapid than the liquid within the shell, this arrangement of the groups of openings insures that the larger portion of the liquid will pass through the slots in three of the plates 15 before emerging from the space between any two adjacent disks.

The degree of dispersion of the ingredients will increase from the inlet end of the emulsifier to the discharge end, and I therefore find it desirable to make the openings 25 in the disks 14 near the inlet end somewhat larger in diameter than the openings in the disk near the discharge end. For the same reason, the slots 17 may be wider near the inlet end of the rotor than near the discharge end.

While the dimensions of an emulsifier embodied in my invention may vary widely, I prefer to employ a shell having an internal diameter of about 12 inches and a length of about 4 feet. With such a shell, eight of the disks 14 spaced at 6-inch intervals may be used. In the disk 14 adjacent the inlet end of the emulsifier, the holes 25 may be four 1-inch holes. In the next disk the four holes may be ¾ of an inch in diameter, and in each of the succeeding disks ½ inch. I prefer to form the plates 15 out of ¼ inch stock, making the slots of the first two groups of slots ½ inch in width and the slots of succeeding groups ¼ inch in width. I have found best results to be obtained if the rotor is rotated at about 1,000 R. P. M.

In the operation of my emulsifier, I depend for emulsification as much upon the eddy currents resulting from the changes in velocity which occur as the liquid passes through the holes 25 and the slots 17 as upon the agitation produced by rotation of the rotor. It will be noted that the walls of the slots 17 are tangential. As a result, the liquid passing through these slots can have no appreciable radial velocity, and the walls of the slots therefore tend to prevent any centrifugal separation of the emulsion ingredients which tends to occur in emulsifiers in which the free outward movement of suspended particles is unimpeded.

I claim as my invention:

1. An emulsifier, comprising a hollow cylindrical shell having an inlet opening at one end and a discharge opening at the other end, a rotor co-axial with said shell, said rotor having a plurality of axially spaced disks approximately of the same diameter as the interior of the shell, and one or more radial plates extending between each pair of adjacent disks, said plates being provided with axially extending slots and said disks with liquid-passing openings.

2. An emulsifier as set forth in claim 1 with the addition that said slots and openings near the inlet opening are larger than those near the discharge opening.

3. An emulsifier, comprising a hollow cylindrical shell having an inlet opening at one end and a discharge opening at the other end, a rotor co-axial with said shell, said rotor having a plurality of axially spaced disks approximately of the same diameter as the interior of the shell, and one or more radial plates extending between each pair of adjacent disks, said plates and disks being provided with restricted liquid passing openings.

4. An emulsifier as set forth in claim 3 with the addition that all the openings in each of two adjacent disks are located on opposite sides of a plate extending between such two disks.

5. An emulsifier, comprising a hollow shell having an inlet opening at one end and a discharge opening at the other, a plurality of axially spaced transverse baffles disposed within said shell, and longitudinal partitions extending between said transverse baffles, all of said baffles being provided with restricted liquid-passing openings and the openings in each of two adjacent baffles being located on opposite sides of a longitudinal baffle extending between such two transverse baffles.

6. An emulsifier, comprising a hollow shell having an inlet opening at one end and a discharge opening at the other, a plurality of axially spaced transverse baffles disposed within said shell, and longitudinal partitions extending between said transverse baffles, all of said baffles being provided with restricted liquid-passing openings and such openings near the inlet end of the shell being larger than those near the discharge end.

7. An emulsifier, comprising a hollow shell having an inlet opening at one end and a discharge opening at the other, a plurality of axially spaced transverse baffles disposed within said shell, and longitudinal partitions extending between said transverse baffles, all of said baffles and partitions being provided with restricted liquid-passing openings.

KENNETH E. McCONNAUGHAY.